Patented Dec. 14, 1948

2,456,314

UNITED STATES PATENT OFFICE 2,456,314

SATURATED LINEAR POLYESTERS OF MERCAPTODICARBOXYLIC ACIDS WITH DIHYDRIC ALCOHOLS

Burt Carlton Pratt, Wilmington, Del., assignor to E. I. du Pont de Nemours & Company, Wilmington, Del., a corporation of Delaware No Drawing. Application August 11, 1945, Serial No. 610,402

6 Claims. (Cl. 260—75)

This invention relates to saturated linear polyesters containing thiol groups as lateral substituents.

This application is a continuation-in-part of my copending application Serial No. 519,647, filed January 25, 1944.

This invention has as an object the provision of saturated linear polyesters of saturated aliphatic mercaptodicarboxylic acids with saturated aliphatic dihydric alcohols, said esters containing thiol groups as lateral substituents. A further object is the provision of polyesters of mercapto succinic acid with ethylene glycol, said esters containing thiol groups as lateral substituents. A still further object is the provision of methods for preparing the said new linear polyesters. Other objects will appear hereinafter.

These objects are accomplished by the following invention of saturated linear polyesters of saturated aliphatic mercaptodicarboxylic acids and saturated aliphatic dihydric alcohols and the preparation thereof by esterification of the dihydric alcohol with the mercaptodicarboxylic acid.

In one method of practicing the invention, a saturated aliphatic dihydric alcohol is reacted with an amount of the saturated aliphatic mercaptodicarboxylic acid required to yield a substantially neutral ester. Thus, for example, a saturated linear polyester of mercaptosuccinic acid and ethylene glycol is obtained by reacting equal molar amounts of the acid and alcohol until the desired degree of esterification has been obtained. The resulting linear polyester, when exposed to air in a thin film in the presence of about 0.10% of a suitable metallic drier forms films which are clear and tough. Upon baking at 100° C. hard films are obtained.

In the preparation of the saturated linear polyesters of this invention it is generally necessary to maintain an inert atmosphere during the esterification, for example, by passing carbon dioxide or nitrogen through or over the reaction mixture. Water formed during the esterification is continuously removed by an ordinary separator. After the desired degree of esterification has been obtained the reaction mixture is discharged from the reactor while still at substantially the reaction temperature.

The more detailed practice of the invention is illustrated in the following examples, wherein parts are by weight. There are, of course, many forms of the invention other than these specific embodiments.

Example 1

A mixture of 150 parts of monomercaptosuccinic acid and 62 parts of ethylene glylcol is placed in a reactor equipped with a stirrer, thermometer, condenser and an inlet tube for nitrogen, and the mixture heated for five hours at approximately 150° C. under a blanket of nitrogen. The acid number of the charge is 585 and after five hours it is 232 (using phenol-violet as indicator). The product obtained is a stiff rubber-like, slightly tacky material which is soluble in cyclohexanone.

Films cast from cyclohexanone solutions and baked for 15 minutes at 100° C. are slightly tacky and colorless. Baking overnight at 100° C. gives very hard, tough, tack-free, water- and alkali-resistant films. Addition of 0.1% of cobalt as cobalt linoleate accelerates drying so that after one hour at 100° C. a film containing the cobalt is tack-free.

Duplication of the above example except that succinic acid is used in place of monomercaptosuccinic acid leads to the formation of an oily liquid which changes to a stiff, greasy, paste, soluble in alcohol-toluene mixtures but not in toluene alone. A film of this product shows no set-up, even on 24 hours baking at 100° C.

Example 2

A mixture of 36.4 parts of coconut oil, 10.2 parts of glycerol and 0.03 part of litharge is placed in the reactor described in Example 1 and the mixture heated for one hour at 200° C. under a blanket of nitrogen. At the end of this time the reaction mixture is cooled to 35° C. and 25 parts of monomercaptosuccinic acid is added, the mixture heated at 150° C. and heating continued at this temperature for 5 hours. Throughout this heating the reaction mixture is kept under a blanket of nitrogen. The product obtained is a clear, gel-like, tacky semi-solid at room temperature. The product analyzes 6.58% sulfur. The product is soluble in alcohol-toluene mixtures and cyclohexanone and fairly dispersible but not soluble in toluene. Films baked on glass overnight show good adhesion and are clear and water-white.

Example 3

A mixture of 19.6 parts of hexamethyleneglycol and 24.8 parts of monomercaptosuccinic acid is placed in the reactor described in Example 1 and heated at about 140° C. for approximately 2 hours and 45 minutes. The product is colorless resin.

The saturated linear polyesters of this invention are the reaction products of a saturated aliphatic mercaptodicarboxylic acid with a saturated aliphatic dihydric alcohol. The mercaptodicarboxylic can be either a monomercapto acid, as exemplified by monomercaptosuccinic acid, 2-mercaptoadipic acid, 2-mercaptosebacic acid, 2-mercaptopimelic acid, etc., or it can contain a plurality of mercapto groups as lateral substituents in the saturated aliphatic chain, e. g.

2,3-dimercaptosuccinic acid, 2,5-dimercaptoadipic acid, 2,9-dimercaptosebacic acid, etc.

The saturated, aliphatic dihydroxy alcohol can be either a glycol, e. g., ethylene glycol, propylene glycol, octamethylene glycol, decamethylene glycol, hexamethylene glycol, 1,12-octadecamethylene glycol, etc., or, as illustrated in Example 2, it can be a higher polyhydric alcohol in which all but two of the alcoholic hydroxyls have been esterified with a saturated aliphatic monocarboxylic acid, preferably an alkanoic acid. Suitable examples are the monoglycerides of hexanoic, octanoic, decanoic, dodecanoic, octadecanoic, and hexanoic acids, etc.

The examples have illustrated preparation of the saturated linear polyesters by reacting the acid with the saturated aliphatic dihydric alcohol. These esters can also be made by reacting the saturated aliphatic dihydric alcohol with an ester of the acid with a monohydric alcohol or by reacting the dihydric alcohol with the acid anhydride or halide.

In the preparation of the saturated linear polyesters temperatures in the range of 120° to 200° C. are generally employed.

The saturated linear polyesters can be used either alone or in admixture with drying oils, natural or synthetic resins, cellulose derivatives, etc. as coating compositions. To these compositions can be added pigments, dyes, fillers, driers, plasticizers, etc.

The invention is not limited to the exact details shown and described for obvious modifications will occur to persons skilled in the art.

What is claimed is:

1. A saturated linear polyester, having thiol groups as substituents on the linear chain, of substantially equimolecular amounts of a saturated aliphatic mercaptodicarboxylic acid containing only carbon, hydrogen, mercaptan sulfur and carboxyl oxygen with a saturated aliphatic dihydric alcohol containing only carbon, hydrogen and hydroxyl oxygen.

2. A saturated linear polyester, having thiol groups as substituents on the linear chain, of substantially equimolecular amounts of mercaptosuccinic acid with a saturated dihydric alcohol containing only carbon, hydrogen, and hydroxyl oxygen.

3. A saturated linear polyester, having thiol groups as substituents on the linear chain, of substantially equimolecular amounts of a saturated aliphatic mercaptodicarboxylic acid containing only carbon, hydrogen, mercaptan sulfur and carboxyl oxygen with ethylene glycol.

4. A saturated linear polyester having thiol groups as substituents on the linear chain, of substantially equimolecular amounts of mercaptosuccinic acid with ethylene glycol.

5. Process of preparing a saturated linear polyester, having thiol groups as substituents on the linear chain, of a saturated aliphatic mercaptodicarboxylic acid containing only carbon, hydrogen, mercaptan sulfur and carboxyl oxygen with a saturated aliphatic dihydric alcohol containing only carbon, hydrogen, and hydroxyl oxygen which comprises reacting as essentially the sole reacting ingredients, said acid with said alcohol at a temperature of at least 120° C. in substantially equimolecular quantity in an inert atmosphere, removing the water formed in the reaction, and isolating the ester.

6. Process of preparing a saturated linear polyester, having thiol groups as substituents on the linear chain, of mercaptosuccinic acid with a saturated dihydric alcohol containing only carbon, hydrogen, and hydroxyl oxygen which comprises reacting as essentially the sole reacting ingredients said acid with said alcohol at a temperature of at least 120° C. in substantially equimolecular quantity in an inert atmosphere, removing the water formed in the reaction, and isolating the ester.

BURT CARLTON PRATT.

REFERENCES CITED

The following references are of record in the file of this patent:

UNITED STATES PATENTS

| Number | Name | Date |
| --- | --- | --- |
| 2,224,037 | Brubaker, et al. | Dec. 3, 1940 |
| 2,389,628 | Martin | Nov. 27, 1945 |